US008290551B2

(12) United States Patent
Landesman et al.

(10) Patent No.: US 8,290,551 B2
(45) Date of Patent: Oct. 16, 2012

(54) SYSTEMS AND METHODS FOR EFFICIENTLY POSITIONING A DIRECTIONAL ANTENNA MODULE TO RECEIVE AND TRANSMIT THE MOST EFFECTIVE BAND WIDTH OF WIRELESS TRANSMISSIONS

(75) Inventors: Lior Landesman, Cupertino, CA (US); Erez Marom, Cupertino, CA (US)

(73) Assignee: Direct Beam Inc., Cupertino, CA (US)

( * ) Notice: Subject to any disclaimer, the term of this patent is extended or adjusted under 35 U.S.C. 154(b) by 575 days.

(21) Appl. No.: 12/474,584

(22) Filed: May 29, 2009

(65) Prior Publication Data

US 2010/0034133 A1 Feb. 11, 2010

Related U.S. Application Data

(60) Provisional application No. 61/188,129, filed on Aug. 6, 2008, provisional application No. 61/191,464, filed on Sep. 9, 2008, provisional application No. 61/209,193, filed on Mar. 4, 2009.

(51) Int. Cl.
*H04M 1/00* (2006.01)

(52) U.S. Cl. ........ 455/575.7; 455/73; 455/430; 370/315

(58) Field of Classification Search ............... 455/575.7, 455/73, 430; 370/315
See application file for complete search history.

(56) References Cited

U.S. PATENT DOCUMENTS

| | | | |
|---|---|---|---|
| 2,526,314 A * | 10/1950 | Alexanderson et al. | 342/158 |
| 4,077,000 A | 2/1978 | Grubbs | |
| 5,077,561 A * | 12/1991 | Gorton et al. | 342/359 |
| 7,079,868 B2 | 7/2006 | Guo | |
| 7,120,468 B1 | 10/2006 | Wilhoyte et al. | |
| 2002/0087674 A1 | 7/2002 | Guilford et al. | |
| 2005/0037822 A1 | 2/2005 | Regnier et al. | |
| 2007/0087758 A1* | 4/2007 | Norris et al. | 455/456.1 |
| 2009/0029703 A1* | 1/2009 | Turnbull et al. | 455/436 |

* cited by examiner

*Primary Examiner* — Lana N Le
*Assistant Examiner* — Hsin-Chun Liao
(74) *Attorney, Agent, or Firm* — Venable LLP; Michael A. Sartori; Christopher Ma

(57) ABSTRACT

Wireless systems and methods establish an optimal wireless communication link by efficiently positioning an antenna module to receive/transmit the most effective signal. An antenna module scans and rotates and receives data such as available networks and the qualities of received signals. Received networks are analyzed, recorded and mapped to antenna variables such as azimuth, elevation and polarity. Automatic or manual selection of a wireless network is based upon antenna variables, qualities of received network signals and predefined conditions. If desired, a more refined antenna position is obtained by the addition of spiral antenna rotations and additional recordings of received data are mapped to antenna elevation, azimuth and polarity. In the event the measured effective signal reception diminishes, the center destination of the spiral path shifts and the process repeats until the highest effective signal reception is found. The disclosed technique acknowledges the realities of complicated modern day signal topography.

7 Claims, 8 Drawing Sheets

*The antenna module scans a path tracking spiral function such as Equiangular Spiral (Logarithmic Spiral, Bernoulli's Spiral)*

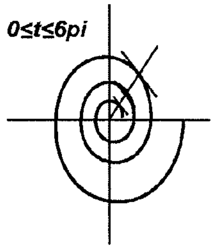

*(1) Polar equation: r(t) = exp(t).*

*(2) Parameter form: x(t) = exp(t) cos(t), y(t) = exp(t) sin(t).*

*(3) Central equation: y = x tan[ln(sqr(x²+y²))].*

$r(t) = e^{-0.1t}$

*The logarithmic spiral*

*The spiral has a characteristic feature: Each line starting in the origin (red) cuts the spiral with the same angle.*

Fig. 3

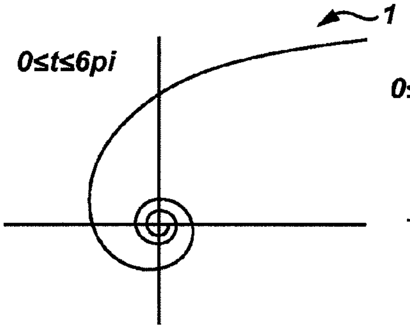

$r(t) = \frac{1}{t}$

Fig. 4A

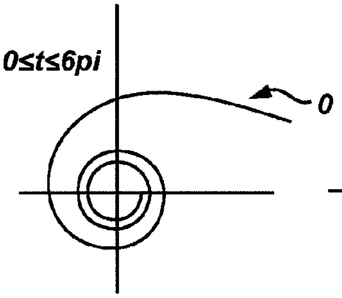

$r(t) = \frac{1}{\sqrt{t}}$

Fig. 4B

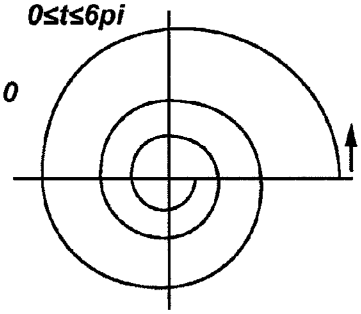

$r(t) = e^{-0.1t}$

Fig. 4C

*Post movement of spiral path*

$$x' = -x\cos\theta + y\sin\theta$$

$$y' = -x\sin\theta + y\,cost$$

*When:*

$$X = x(t) = \exp(t)\cos(t)$$

$$Y = y(t) = \exp(t)\sin(t)$$

*Post transformation:*

$$X' = X'(t) = [\exp(t)\cos(t)]^{*}\cos(\alpha) + [\exp(t)\sin(t)]^{*}\sin(\alpha)$$

$$Y' = Y'(t) = [\exp(t)\cos(t)]^{*}\sin(\alpha) + [\exp(t)\sin(t)]^{*}\sin(\alpha)$$

| Position (Point) | Signal Strength (dBm) | Speed (Mbps) |
|---|---|---|
| P1 | 71 | 35 |
| P2 | 67 | 45 |
| P3 | 65 | 56 |
| P4 | 63 | 65 |
| P5 | 61 | 75 |
| P6 | 59 | 85 |
| P7 | 57 | 90 |
| P8 | 55 | 94 |
| P9 | 53 | 101 |
| P10 | 52 | 117 |
| ..... | ..... | ..... |
| ..... | ..... | ..... |
| P40 | 42 | 142 |
| P41 | 42 | 142 |

SYSTEMS AND METHODS FOR EFFICIENTLY POSITIONING A DIRECTIONAL ANTENNA MODULE TO RECEIVE AND TRANSMIT THE MOST EFFECTIVE BAND WIDTH OF WIRELESS TRANSMISSIONS

RELATED PATENT APPLICATION AND INCORPORATION BY REFERENCE

This is a utility application based upon U.S. patent application Ser. No. 61/188,129, entitled "Antenna system and method for automatic positioning of wireless antenna," filed on Oct. 6, 2008; U.S. patent application Ser. No. 61/191,464 filed on Sep. 9, 2008, entitled "Methods for enabling portable devices to connect and control external antenna systems"; U.S. patent application Ser. No. 61/209,193 filed on Mar. 4, 2009 entitled "Automatic positioning of wireless antennas." These related applications are incorporated herein by reference and made a part of this application. If any conflict arises between the disclosure of the invention in this utility application and that in the related provisional applications, the disclosure in this utility application shall govern. Moreover, the inventors incorporate herein by reference any and all patents, patent applications, and other documents hard copy or electronic, cited or referred to in this application.

BACKGROUND OF THE INVENTION (1) Field of the Invention

The invention relates generally to means and methods of efficiently moving an antenna module to a position to receive and transmit the most effective reception and transmission of a selected wireless network. More particularly, the invention takes advantage of a new postulate predicting that a directional antenna moving along a spiral path will have a gradient pointing to a better signal reception or the position of the most effective reception.

(2) Description of the Related Art

In the known related art, directional antennas are positioned in a haphazard manner, with little or no though given to a systematic approach or an approach acknowledging the complex peaks and valleys of modern day transmission protocols.

BRIEF SUMMARY OF THE INVENTION

The present invention overcomes shortfalls in the related art by presenting an unobvious and unique combination and configuration of methods and systems to efficiently find the best antenna module position to optimally receive/transmit information from a selected wireless network.

In one embodiment, an antenna module is set to a fixed elevation parallel to the Earth's horizon and the antenna module makes one initial rotation. During the initial rotation or scanning, received signals, network information and other data and corresponding antenna module positions are recorded into a database. The antenna module may rotate in increments of N degrees, wherein N is less than the beam width of the directional antenna contained within the antenna module. A selection of a network may then occur. The selection of a network may take into account predefined user parameters as well as the data recorded during the initial rotation. If the desired network signal is acceptable, the antenna module may rotate to the position corresponding to the point where the most effective reception occurred for the selected network. A connection to the selected network is then completed.

In a further embodiment, where the signals recorded during the initial rotation needs to be refined, additional steps may be performed to achieve a better antenna position and thus a stronger reception. After the first rotation, additional rotations are executed wherein both the azimuth and elevation are adjusted so that the additional movements of the antenna module take the path of a spiral. The spiral path is used on the presumption that the gradient of the spiral will lead to the point of the most effective bandwidth reception. Thus, there is a presumption that the next position of the antenna module will lead to a position greater desired signal qualities and that the ending point of the spiral path will be the point of maximum signal quality. In the event the measured data is inconsistent with these presumptions, the origin or ending point of the spiral is shifted in one or two dominions and shifted in distance proportional to the variance in the recorded data.

In one possible scenario, the presumptions of the system are confirmed by the signals received and the antenna module stops at a point of diminishing marginal returns or where there is little or no increase in signal quality.

In another possible scenario, the selected network has multiple peaks and valleys and a relatively lower signal quality is recorded as the antenna module moves from the base of a peak to a valley. At this juncture, the spiral path is shifted by either a number of degrees in azimuth and/or a number of degrees in rotation. The spiral process continues and either shifts one or more times and/or stops at a point where increases in signal strength become trivial. Due to the possibility of a selected network having more than two peaks, it is possible that the ending spiral path will have an ending point on top of a peak that is not the highest peak.

The invention includes an antenna system and the use and configuration of a closed loop system to position a directional antenna or antenna module accurately and automatically or manually. The antenna module may take the form of a smart antenna meaning that the narrow beam achieved with an antenna array with different amplitude and phase control. Positioning of a smart antenna may be accomplished by changing the electrical characteristics of the antenna's array such as amplitude, phase or the parameters of the receiver (DSP in the case of MIMO). The disclosed system can be designed to work with any wireless communication and TV reception. Wireless communication such as WiFi (a, b, g, n and future standard), WiMAX, Mobile methods (3GPP, GAN, 3G, 4G, IMS, GPRS, CDMA, UMTS, GSM, CDMA, AMPS) and any other standard that works at high frequency. TV reception supports all the known analog and digital TV standards including by not limited to, NTSC, PAL, DV-T, and DMB-T/H.

BRIEF DESCRIPTION OF THE DRAWINGS

FIG. 3 is plan view of a logarithmic spiral with the point of origin located at the center of the spiral FIG. 4A a graphical representation of a spiral where $r(t)=1/t$ FIG. 4B is a graphical representation of a spiral where $r(t)=1/\sqrt{t}$ FIG. 4C is a graphical representation of a spiral where $r(t)=e^{-0.1t}$

REFERENCE NUMERALS IN THE DRAWINGS

Figure 1:
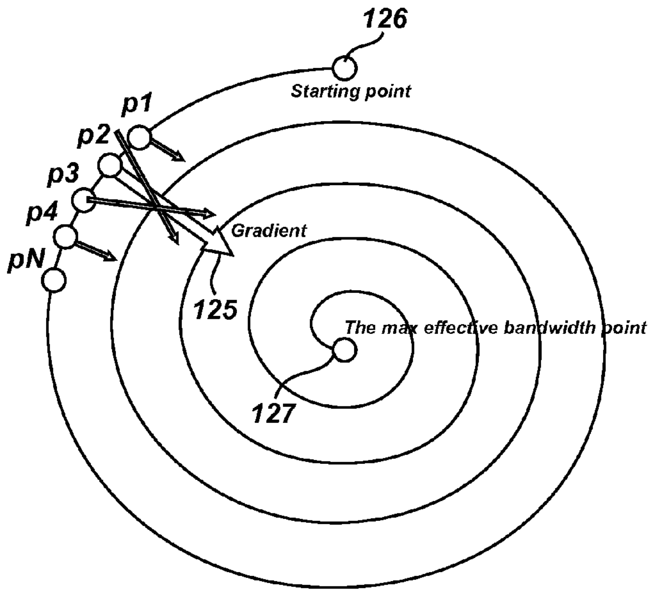
FIG. 1 is a diagram of a spiral path showing gradient vectors pointing to the center of the spiral, the point of the predicted maximum effective bandwidth point.

10 access point (e.g. WiFi, WiMax) or base station (e.g. Cellular), the origin or source of a communication and a radio frequency (RF) link.

12—access point or base point antenna, an antenna that receives or transmits the radio frequency ("RF") signal to and from the end users.

14 radio frequency communication link between base and end user.

15 end user antenna, needs to be precisely positioned toward the base antenna to receive or transmit a maximum of energy between the two.

16 end user device comprises of wireless transceiver and end user computing device such as PC, laptop, PDA, cell phone and other personal electronic devices.

18 directional Antenna—an antenna that it is not omni directional, meaning that the antenna's beam Width is less than 360 degrees, preferably as narrow as can be achieved. Directional antenna can be a conventional antenna such as Yaggi, Dish, Flat antenna or others. Positioning of ordinary known antennas is done by motorized base that enables the change of the azimuth or/and elevation or/and polarization and thus the direction of the main beam.

19 option for smart antenna meaning that the narrow beam is achieved with Antennas array and Amplitude and Phase control between Antennas.

Positioning of Smart Antenna is done by changing electrical characteristics of the Antenna's array such as Amplitude, Phase or the Parameters of the receiver (DSP in case of MIMO etc.). In the case of the Smart Antenna instead of the motorized Pan/Tilt/Polarization the Control Signals 26 controls electrical parameters of the Antenna array, by changing these parameters the Directional Antenna changes the direction of the main Beam. The Smart Antenna can be part on MIMO (Multi In Multi out) Antennas in an Wifi Network type N. In this case the Motor Control/DSP 28 controls the smart antenna and three RF signals replace the single RF Signal 23 and 24 (each will be replaced with three signals).

20 mechanical axis, rotating the antenna within three dimensions: pan (up to 360 degrees), tilt (up to 180 degrees), polarization (horizontally, vertically). The antenna module may be moved manually within three dimensions, in case that the antenna module is embedded inside the end user device (i.e. Laptop) the end user device may be rotated manually.

22 motors, Servo or Stepper to move the desired Axis.

23 RF (Radio frequency) transmitting signals from the transceiver via coax cable or impedance controlled PCB routing.

24 RF (Radio frequency) receiving signals from the Antenna, via coax cable or impedance controlled PCB routing. These signals are the feedback of the close loop control.

26 Control Signals to the motors, rotate the Antenna to any predefine position.

28 Motors Controller, Servo or Stepper control circuitry that translates the position request to control signals for the Motors.

30 Wireless Transceiver, convert the RF signals to Data Stream (for receiving) and vice versa, convert the Data Stream to RF signal (for transmitting).

32 Data In Link, use to move the wireless data (WiFi, WiMax, Voice etc.) and the control data between the transceiver and the End User Device. The control data is predefined structure (e.g. in WiFi 802.11 b/g etc.) and includes parameters like signal strength, wireless identification and others. The data link can be implemented via multiple formats such as Serial, USB, Ethernet, Firewire, Bluetooth and others.

33 Data Out Link, send data from the End User to the Access point/Base station Point

34 Digital Control Signals, commands for the motors controller for searching and positioning (i.e. position setup) the Antenna. In case of a Smart Antenna 19 the commands will be change electrical parameters for the Smart Antenna (such as Amplitude and Phase) and thus move the main beam of the Antenna to the desired direction.

35 Data in/out Link and the Digital Control Signals are implemented on the same physical interface link. This Link can be any wire or wireless duplex data communication for example: Wire interfaces—Serial, USB, Ethernet, Firewire and others. Wireless interfaces: WiFi, WiMax, Bluetooth and others.

36 End User Device, Mobile or Stationary End User Device that use the Data (e.g. for Internet connection, Voice, Video etc.) and act as Computing platform and/or Phone platform.

38 Antenna Positioning Control Algorithm—Software to be run on the end User Device or embedded with the Transceiver. The Algorithm obtains all parameters on the incoming signals (e.g. Strength, Bandwidth, Frequency, Network ID and others) and controls the Antenna position (with option for three dimensions controlled) until the quality of the data link is optimized.

40—Control, Closed Loop By sampling the receiving RF signal and extract its characteristics such as wireless network type, network name etc, and measuring the Signal Strength the Closed Loop controls the Antenna Positioning. The Control Loop positions the Antenna to the point where the requested signal is in its maximum strength/quality.

42 Same as 28 with added Computing Function and embedded software to implement the Antenna Positioning Control Algorithm 38.

44 General Control Signals, since the positioning control is made by the Motor Controller (embedded in it) there is no need for the motor's positioning commands only General Control over the Antenna System for example—selection for preferred channel that the End User selects to lock the Antenna.

46—Same as 36 without the Positioning Algorithm.

111 a lower peak of transmission found within a Marco strip transmission

112 a higher peak of transmission found within a Marco strip transmission

120 a starting point of a spiral superimposed upon a topographical signal map

121 a center point of a spiral superimposed upon a topographical signal map

123 a starting position for a spiral path

124 a shifted position for a spiral path

125 longer vector arrow of FIG. 1 representing a gradient value

126 the starting point of the spiral of FIG. 1

127 the ending point of the spiral of FIG. 1, representing the point of the maximum effective bandwidth.

Figure 7:
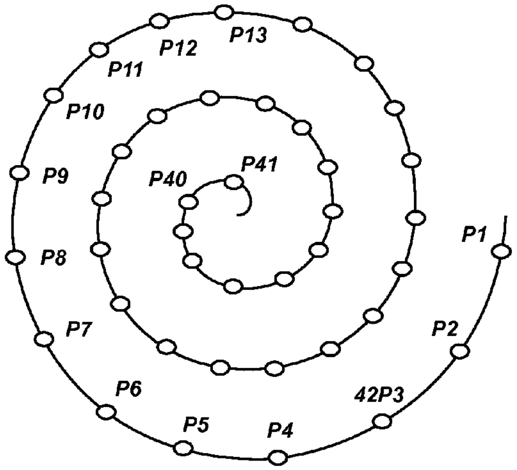
FIG. 7 is a plan view of a spiral path marked with 41 points of measurement

P1 to P41 positions along the spiral path of FIG. 7 and FIG. 1

These and other aspects of the present invention will become apparent upon reading the following detailed description in conjunction with the associated drawings. The present invention overcomes shortfalls in the related art by inter alia combining a directional antenna solution with new methods of quickly and efficiently ascertaining the optimal antenna position. Economies in hardware and power consumption are obtained by the efficiencies of the disclosed system. Other aspects and advantages will be made apparent when considering the following detailed descriptions taken in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Referring to FIG. 1, an antenna position method using spiral movement with gradient calculating is presented. The main premise of the method is the assumption that gradient will point closer and closer to the center of the spiral and that the center of the spiral will comprise the point of the most effective band width or signal strength. After an initial scan of 360 degrees or less and wherein data is collected during the initial scan, a subsequent spiral scan is performed and the antenna module is pointed toward the cumulative gradient vector of the spiral. In FIG. 1, arrow 125 represents the cumulative vector for points 1, 2, 3 and 4. The spiral movement of the antenna module will stop when the signal qualities stop improving. If the signal qualities should diminish, the system will shift the origin of the spiral and continue. An example of a shifted spiral is found in FIG. 6.

Figure 2:
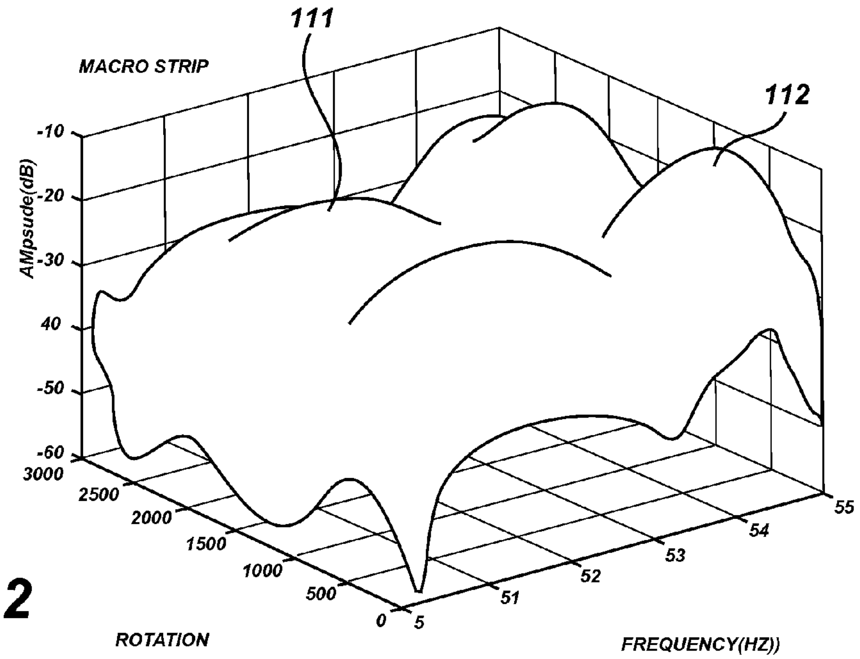
FIG. 2 is a perspective view of a macro strip transmission topography

Referring to FIG. 2, an example of a multi peaked network transmission is shown with a lower peak 111 and a higher peak 112. Unlike the known related art, the disclosed system takes into account multi peaked network topographies by allowing for a shift in spiral origin, (see FIG. 6) when a valley is traversed.

Referring to FIG. 3, an example equiangular spiral is illustrated and corresponding functions are shown.

Referring to FIGS. 4A, 4B, and 4C, spirals of different equations are shown with their respective formulas.

Figure 5:
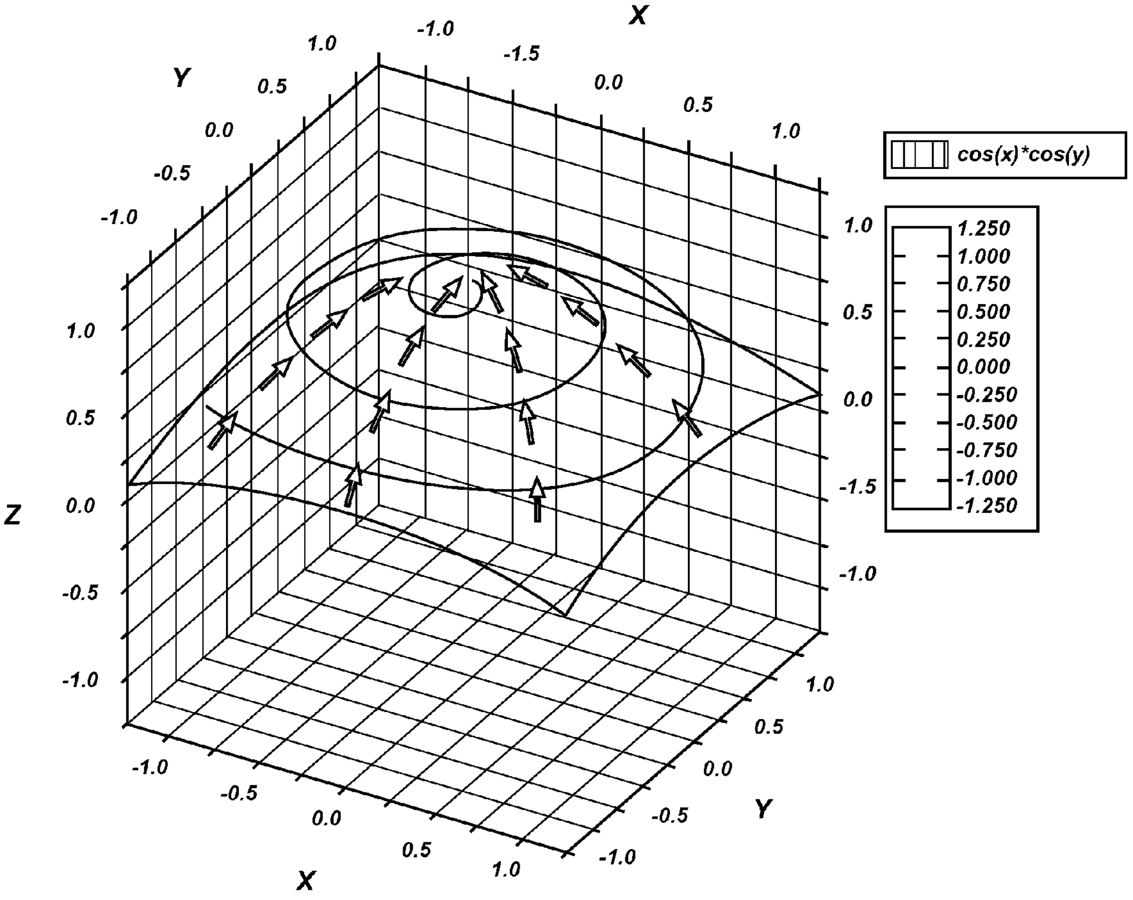
FIG. 5 presents a spiral path consistent with the principles of the invention, applied to a WiFi IEEE 802.11n network transmission FIG. 6 present two spirals paths, one being an original path, the other being a path after a shifting of the origin has occurred.

Referring to FIG. 5 a spiral path is shown upon a typical mono peak signal topography wherein the best band width is found at the top of the peak. The figure also shows a spiral path consistent with the principles of the invention.

Figure 6:
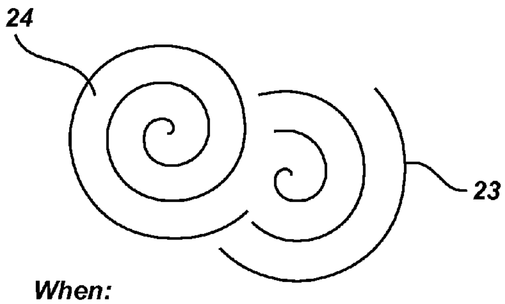

Referring to FIG. 6 two spiral paths are shown to illustrate the movement of the origin of a spiral path. The movement or shifting of the origin occurs when a subsequent spiral value is lower than a prior value. When such a dip in values occurs, there is a likely hood that a valley between peaks has been reached and that a shift will point to a higher peak. An example of a multi peak signal topography is shown in FIG. 2.

Referring to FIG. 7, a spiral path is shown with 41 points of measurement. The measured values are illustrated within the chart of FIG. 8. The path and values of FIGS. 7 and 8 reflect a path not crossing any valley and wherein bandwidth increases towards the center or point of origin of the spiral.

Figures 8, 9:
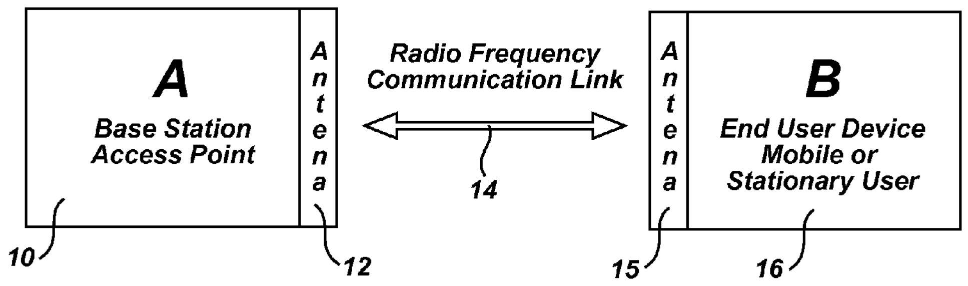
FIG. 8 is a three column table mapping the 41 points of measurements of FIG. 8 to corresponding signal strength measurements and data speed measurements
FIG. 9 is a schematic and general description of a radio frequency communication link.

Referring to FIG. 8, a three column chart is presented to reveal signal strength and network speed measured at points P1 to P41.

Referring to FIG. 9, a block diagram shows an example of a base station 10, a base station antenna 12, a radio frequency communication link 14, an end user device 16 and an end user antenna 15.

Figure 10:
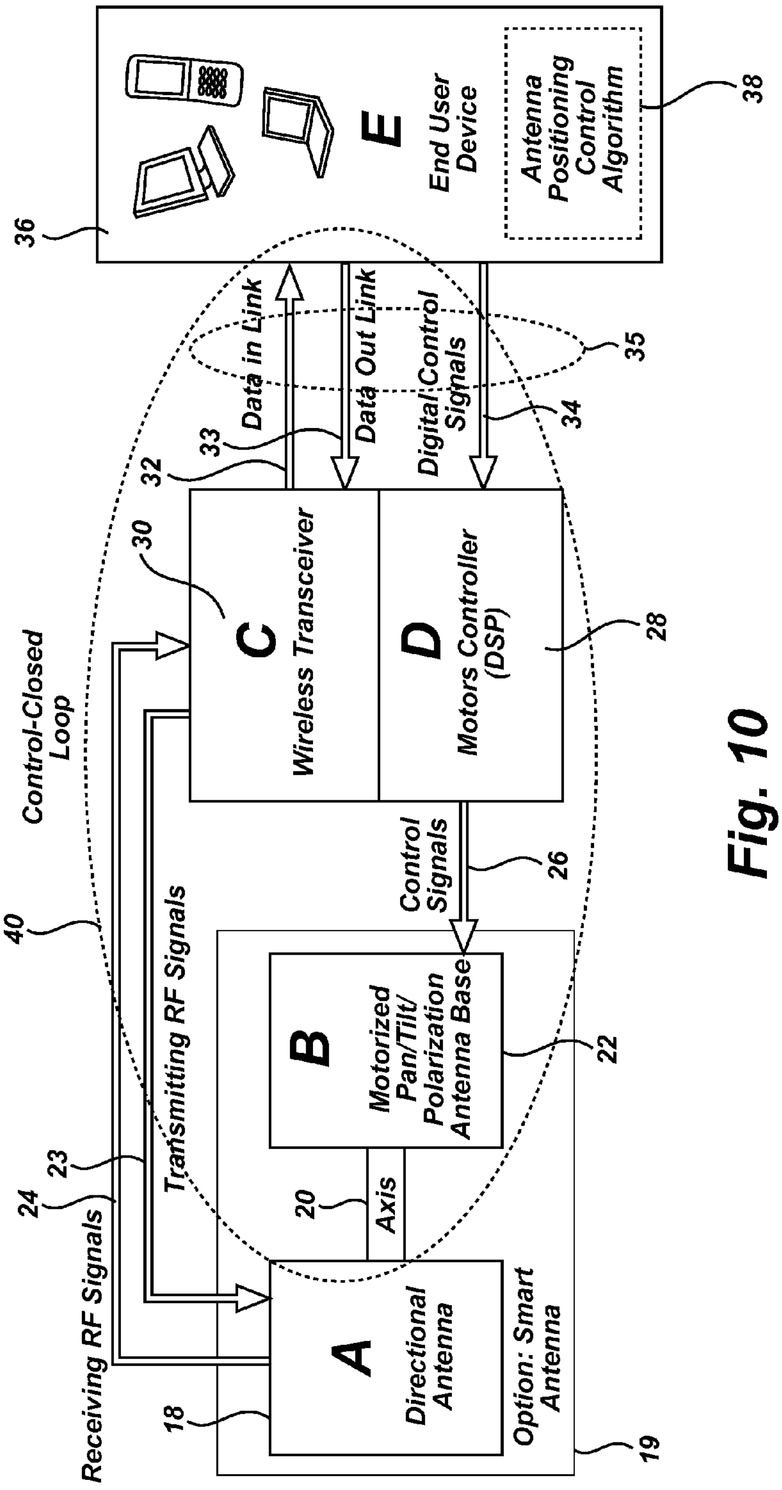
FIG. 10 is a block diagram of a closed loop system used for positioning an antenna module.

Referring to FIG. 10 a closed loop control structure 40 controls a directional antenna 18, an optional smart antenna, a motorized antenna base 22, a DSP motor controller 28, a wireless transceiver 30 a data link in 32 and a data link out 33, an end user device 36, an antenna positioning control method 38 and other features.

Figure 11:
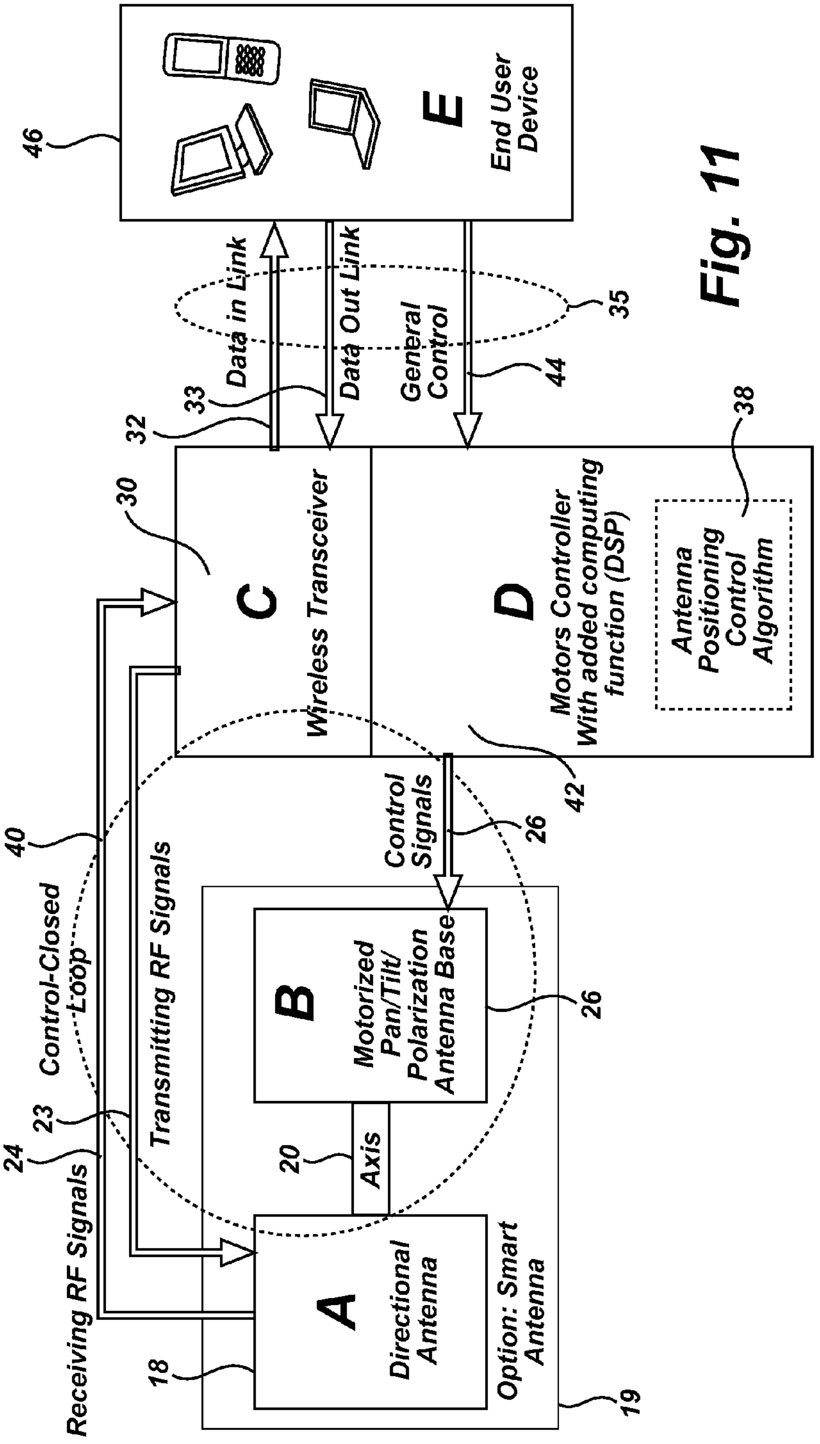
FIG. 11 is a block diagram of an alternative embodiment of the invention embedded control systems contained within the antenna system.

Referring to FIG. 11 a closed loop control structure uses a control system contained with in the motorized antenna controller.

Figure 12:
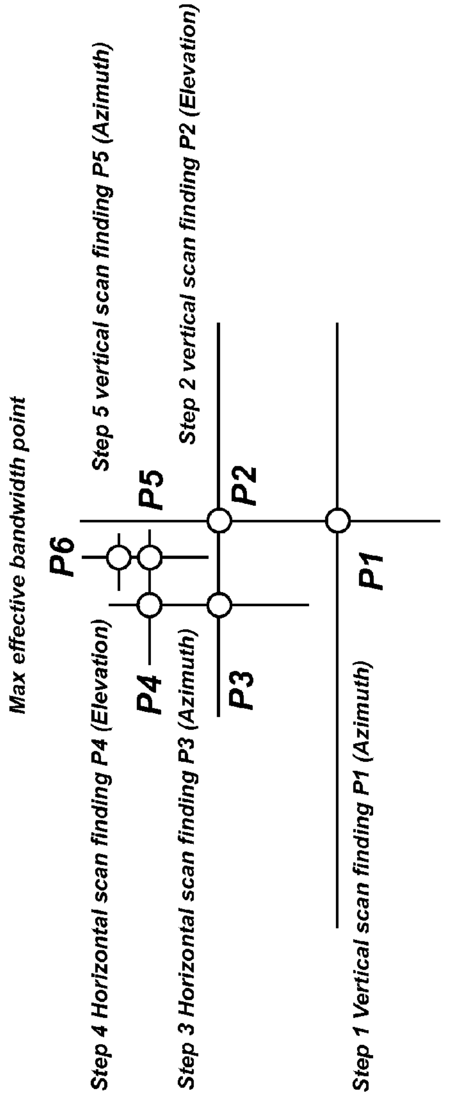
FIG. 12 is an antenna positioning flow chart using an iteration method of vertical and horizontal scanning.

Referring to FIG. 12, an antenna positioning flow chart using an iteration method of vertical and horizontal scanning is presented in the following steps:

Assuming that a WiFi/WiMax network has been selected, the direction of maximum effective bandwidth is found by:

Step 1: According to the collected records from a previous scan—Position the Antenna (Change Azimuth only) in the Azimuth which gave max peak of the Signal Strength of the selected Network.

Step 2: Scan in Vertical direction (Elevation) only 0-180 Degrees and find the point of Max Signal Strength-Position the Antenna to the Vertical point which gave the max Signal Strength—Step 2 is done Only in a system with 2D i.e. Horizontal and Vertical.

Step 3: Scan in Horizontal direction (Azimuth) only 0-180 Degrees and find the point of Max Signal Strength-Position the Antenna on the Horizontal point which gave the max Signal Strength. Repeat on steps 2 and 3 till there are no improvements in the Signal Strength, or the improvement in Signal Strength is less then predefined parameter.

While certain aspects of the invention are presented below in certain claim forms, the inventors contemplate the various aspects of the invention in any number of claim forms. Accordingly, the inventors reserve the right to add additional claims after filing the application to pursue such additional claims.

The invention includes, but is not limited to the following items.

Item 1. A method to enable a wireless antenna module to be positioned to optimally receive or transmit signals from or to a base station or access point, the method comprising the steps of:

a) finding available networks by:
- i) positioning a wireless antenna module to an elevation of 90 degrees wherein the antenna is in a position parallel to the horizon by:
  - aa) assigning a value for N wherein N is equal to or less than a beam width of the antenna module;
  - bb) assigning a value to North of azimuth 0 degrees;

b) recording input parameters by:
- i) rotating the azimuth of the antenna 360 degrees in steps of N degrees;
  - aa) for each step of N degrees the antenna is rotated, a scan to find available networks is preformed;
  - bb) for each detected network, azimuth, name, signal strength, network bandwidth and other network parameters are recorded within a data base;

c) selecting a network by:
- i) from the database select manually the desired network or select the desired network automatically based upon predefined parameters, the parameters comprising the group of: encryption status, signal strength, and bandwidth;

d) finding the position for most effective bandwidth by:
- i) from review of the records recorded within the database, and by using close loop feedback moving the antenna module along the azimuth axis only, to an azimuth value mapping to the best effective bandwidth value of the selected parameter of a selected network; or
- ii) rotating the antenna again in steps of N each step record the effective bandwidth and compare to the maximum value in the data base (no need to know the recorded azimuth value) if the recording value is equal or bigger the maximum value, stop rotating; and e) connecting to the selected network.

Item 2. The method of item 1 further comprising:

a) selecting a network to connect to and positioning the antenna module to the best known position;

b) recording additional input parameters by:
- i) positioning the antenna along the elevation axis only to an elevation of between 80 to 85 degrees and at the azimuth point which received the maximum peak signal strength recorded during the prior input process of claim 1;
- ii) rotating the antenna is an upward spiral path in steps of N degrees while inputting collected network values, signal values and antenna position values into a database; and c) finding the position for most effective reception by:
- i) from review of the records recorded within the database, moving the antenna along the prior spiral path to a position mapping to the highest recorded effective reception of the selected network and connecting to the selected network.

Item 3. The method of item 2 wherein the next position along the antenna's spiral path is determined by finding a gradient output by using the records being obtained during the spiral movement of the antenna and inputting the records into an error function to obtain the gradient toward the global minimum value and using the gradient output to determine the next point to place the antenna.

Item 4. The method of item 3 wherein the ending location of the antenna points the antenna to the vector with a magnitude reflecting the largest distance of change of the gradient function.

Item 5. A system to establish an optimal wireless communication link by efficiently positioning an antenna module to receive/transmit the most effective signal reception, the system comprising:

a) an antenna module comprising a directional antenna;

b) means to rotate the antenna module and scan 360 degrees or less such that different azimuth positions are achieved;

c) means to record in to a database network's data received by the antenna module and corresponding antenna module positions; and d) means to select, position the antenna module to optimal position, keep the best position by utilizing a close loop control system and connect to a wireless network based upon the values of data received for each found network and predefined user conditions.

Item 6. The system of claim 5 wherein means to rotate the antenna module manually or to manually rotate a device attached to the antenna module where the antenna module is embedded into a device and means to rotate the antenna module by motorization or electronically where the antenna module comprises a phase array.

Item 7. The system of claim 5 including a closed loop system having a smart interface between the antenna module and the end user device to provide means of controlling the movements of the antenna module.

Item 8. The system of claim 5 wherein after step c) a more refined antenna module position is obtained by the addition of spiral antenna module rotations and additional data received by the antenna module is recorded into the database with the corresponding antenna module elevation, azimuth and polarity; and means of stopping the spiral rotation in route to a center point when the improvement of signal quality stops.

Item 9. The system of item 6 with means to shift the center point of the spiral path in the event a spiral path moves to a position of lower signal quality as compared to the immediate previous position.

Item 10. The system of claim 5 wherein the antenna module comprises:

a) a directional antenna only for SISO (Single in Single Out) systems;

b) an antenna array of one to N, wherein N represents an integer of one or greater, the preferred value of N being between 1 and 4, to comprise omni directional antennas or 1 to N wide beam directional antennas for MIMO systems;

c) a hybrid system of a directional antenna and an antenna array for MIMO systems and wherein when the SNR (Signal to Noise Ratio) is lower than xxx?? the system is switched to a SISO system utilizing the directional antenna only.

Item 11. A method of finding the most effective reception position to receive or transmit wireless transmissions, the method comprising:

a) positioning an antenna module, to a fixed elevation parallel to the horizon, the antenna module comprising a directional antenna;

b) spinning the antenna module one full rotation while received signals are recorded into a database and mapped to corresponding antenna variables such as azimuth;

c) selecting a wireless network to receive based upon the data in the database and predefined user parameters;

c) obtaining a further signal location information by rotating the antenna module along a spiral rotation path while presuming that the gradient of the spiral rotation will point to the spot of the most the effective reception from the selected wireless network, the spiral path having a projected ending point;

d) in the event a lower signal value is found along the spiral path, the projected ending point is shifted by a distance of five to fifteen percent of the measured drop in signal strength, and movement along the spiral path continues; and e) moving the antenna module along the spiral rotation path until no further improvement in signal quality of found.

What is claimed is:

1. A method to position a wireless antenna module to receive from or transmit to a network, the method comprising:

a) positioning the wireless antenna module to a first initial position, the wireless antenna module comprising an antenna array having a main beam with a beam width;

b) rotating the main beam of the antenna array substantially azimuthally 360 degrees in steps of N degrees, wherein N is a fixed or variable number;

i) for each step of N degrees the main beam of the antenna array is rotated, performing a scan to detect available networks; and ii) for each of the detected available networks, recording, in a database, an entry associated with the network wherein the entry comprises an azimuth angle, a name, and a signal quality parameter;

c) selecting a network from the detected available networks by:

i) manually selecting a desired network from the detected available networks in the database; or ii) automatically selecting the desired network from the detected available networks in the database using a plurality of predefined parameters comprising a network name, a network profile, an encryption status, and a signal quality parameter;

d) determining a new position for the main beam by:

i) reviewing entries recorded in the database, and using a closed loop control structure to move the main beam of the antenna array to the new position corresponding to a substantially maximum signal quality parameter recorded in the database for the selected network; or ii) moving the main beam of the antenna array in steps of N degrees, recording at each step, a signal quality parameter and comparing the recorded signal quality parameter to a maximum value in the database, and if the recorded signal quality parameter is equal to or larger than the maximum value, stopping at the corresponding step as the new position; and e) connecting the wireless antenna module to the selected network.

2. The method of claim 1, further comprising:

recording additional entries into the database for the selected wireless network by:

i) positioning the antenna array to a second initial position different from the first initial position; and ii) rotating the main beam of the antenna array in a spiral path in steps of N degrees, recording in the database, at each step, a signal quality parameter, and information encoding a position of the main beam.

3. The method of claim 1, wherein said moving the main beam of the antenna array in steps of N degrees is along a spiral path and the spiral path is determined by:

obtaining a gradient output toward a global minimum value by applying an error function to the signal quality parameter being recorded along the spiral path already traversed and the recorded additional entries in the database; and determining a subsequent step along the spiral path by using the gradient output.

4. The method of claim 1, wherein said moving the main beam of the antenna array in steps of N degrees is along a linear path.

5. The method of claim 1, wherein the signal quality parameter comprises at least one of a signal strength, a network bandwidth, or a wireless link speed, wherein the signal strength is at least one of a signal to noise ratio (SNR), a received signal strength indicator (RSSI), or a carrier to interference noise ration (CINR).

6. A method for wireless communications, the method comprising:

a) positioning an antenna module to an initial position, the antenna module comprising an antenna array having a main beam;

b) spinning the main beam of the antenna array substantially one full rotation while detecting wireless networks and recording signal qualities of the detected wireless networks as entries into a database, each entry being mapped to a corresponding azimuthal position of the main beam;

c) selecting a detected wireless network to connect based upon the recorded entries in the database and predefined user parameters;

d) moving the main beam of the antenna array along a spiral or linear path wherein the gradient of the spiral path points to an improved reception position for the selected wireless network, and wherein the spiral or linear path has a projected ending point;

e) in the event that a lower signal quality of the selected wireless network is found along the spiral path, shifting the projected ending point by a distance substantially proportional to the measured drop in signal quality; and f) moving the main beam of the antenna array along the spiral or linear path until the signal quality of the selected wireless network stops improving.

7. The method of claim 6, wherein the recorded signal qualities comprise at least one of a signal strength or a wireless link speed.

* * * * *